No. 749,749. PATENTED JAN. 19, 1904.
J. ROGER.
STOPPERING DEVICE FOR SPARKLING LIQUIDS.
APPLICATION FILED MAR. 24, 1903.

NO MODEL.

Witnesses:

Inventor
Jules Roger
By Wm. E. Boulter,
Attorney

No. 749,749. Patented January 19, 1904.

UNITED STATES PATENT OFFICE.

JULES ROGER, OF MONCEAUX, NEAR LISIEUX, FRANCE.

STOPPERING DEVICE FOR SPARKLING LIQUIDS.

SPECIFICATION forming part of Letters Patent No. 749,749, dated January 19, 1904.

Application filed March 24, 1903. Serial No. 149,354. (No model.)

*To all whom it may concern:*

Be it known that I, JULES ROGER, a citizen of the French Republic, residing at Chateau des Monceaux, near Lisieux, France, have invented a certain new and useful Stoppering Device for Sparkling Liquids, of which the following is a specification.

This invention relates to a stoppering device for sparkling liquids, which prevents them from escaping until a plug of the cock arranged in the neck of the bottle has been turned. This stoppering device is combined with a device enabling it to be secured to the bottle, and the plug of the cock is arranged so as to receive a special capsule intended to contain any product—powder, syrup, &c.—used either in the manufacture of sparkling waters or in that of champagne, &c., said capsule being secured to the device in a perfectly air-tight manner, and owing to the special arrangement of the plug enabling the products used to be introduced into the contents of the bottle without any contact with the air and without any loss of gas.

Figure 1:
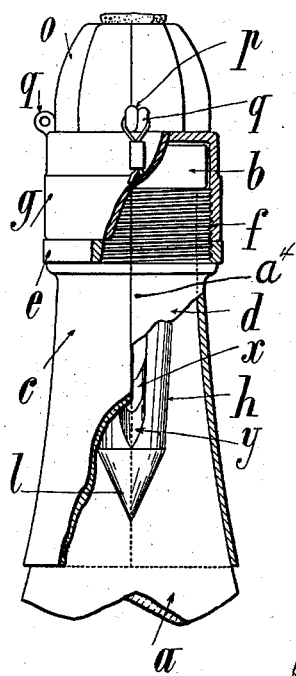
Figure 2:
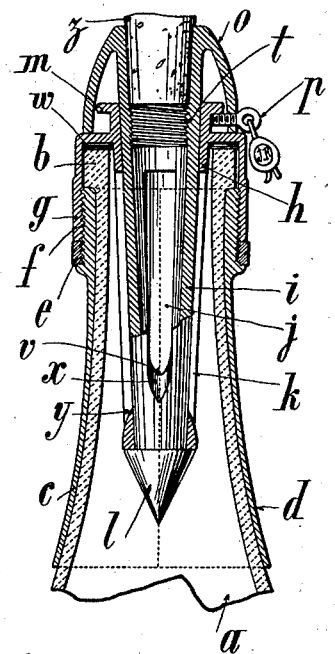
Figure 3:
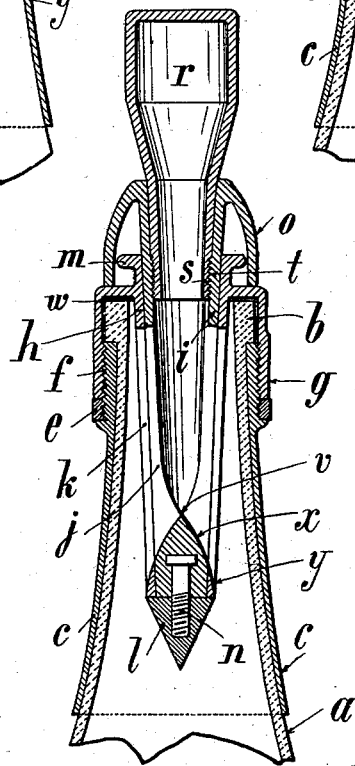

In the accompanying drawings, Figure 1 is an outside view of the stoppering device according to this invention arranged on the bottle as it would be placed on the market, a part of the device being shown broken off, so as to show the manner of fixing. Fig. 2 is a vertical section through the axis of the bottle, the device being shown closed. Fig. 3 is a similar section to that shown in Fig. 2, the stoppering device being shown open and containing the capsule holding any product—powder, syrup, &c.—adapted for the manufacture either of sparkling liquids or of champagne.

According to this invention the neck $a$ of a bottle is provided under its top collar $b$ with a casing constituted by two cups $c\ d$ of semi-conico-cylindrical shape, joining at their vertical edges $a^4$, so as to inclose the neck of the bottle. The top of the casing $c\ d$ rests against the bottom of the ring $b$ and is provided with a screw-thread $f$, intended, first of all, to receive a nut $e$, which, being screwed on the assembled casing, connects the two cups $c\ d$ and secures them to the bottle. The remaining portion of the screw-thread $f$ of the casing lying above the nut $e$ receives a guard $g$, inclosing the top of the neck of the bottle and provided with a cock-casing $h$, placed vertically in the center of the neck. This guard $g$ when it is screwed down on the casing $c\ d$ presses against a washer $w$, made of some elastic material, whereby air-tight closing of the bottle is insured.

In the casing $h$ is arranged a conical plug $i$ of the cock, which is hollow and provided with two orifices $j$, arranged diametrically opposite and joining at the inner lower part of the plug, so as to form a V upside down, for the purpose hereinafter described. The two orifices $j$ of the plug coöperate with two also diametrically opposite holes $k$ in the casing $h$ of the cock and in such manner that no communication of the interior of the bottle with the atmosphere is possible when the openings $j$ and $k$ are placed at a right angle relatively to each other. The fixing of the plug $i$ in the casing $h$ is effected by means of a nut $l$, which is screwed on a screw $n$, countersunk in the material of which the plug $i$ is formed. The top of the plug $i$ forms a kind of mushroom $o$, the circumference of which covers a flange $m$, formed on the top of the guard $g$ of the casing $h$. This mushroom $o$ has screwed into it a screw with a head $p$ or an eyebolt, the ring of which is intended to coöperate with two other rings $q$, secured to the guard $g$, and which when the bottle is in use serve to limit the movement of the plug of the cock in either direction, corresponding to the completely closed and open positions. These rings $p\ q$ may be also used when the bottle is closed to receive a string with a lead seal, guaranteeing the closing.

With this system of stoppering may be combined a capsule $r$, which being closed by any suitable means is intended to contain powders, syrups, or any other products to be mixed with the liquid contained in the bottle, either for the manufacture of sparkling waters or champagne or other wine. The capsule $r$ is provided round its top orifice with a screw-thread $s$, which when the capsule is inverted may be brought to engage with a screw-thread $t$ on the interior of the plug $i$, arranged at a certain distance from the top of the said plug. The portion of the passage of the plug above the screw-thread $t$ is conical, and the part under the screw-thread $s$ of the capsule $r$ is of a corresponding shape, so as to insure an absolutely air-tight joint of the two parts when the capsule is screwed on the bottle. The orifices $j$ of the lower part of the plug $i$ are continued at the bottom by inclined passages $x$, with a common and angular edge $v$, which in their turn are continued by passages $y$, also inclined and formed at the bottom of the orifices of the casing $h$, so as to insure that the matter, whether powder or liquid, contained in the capsule $r$ will flow away; otherwise the said matter could be stopped by projections or throttled portions. The portion of the plug $i$ arranged above the screw-thread $t$ is also intended to receive an auxiliary stopper $z$, which insures perfect air-tightness of the bottle. When sparkling liquids contained in the bottle have a very strong pressure of gas, this stopper is forced out by their pressure, when after having cut the string the plug of the cock is turned so as to open it and to pour out the liquid.

The use of the capsule $r$ with the cock is effected in the following manner: The plug $i$ being in the closed position, the capsule $r$ is screwed, after having been uncorked, in the top orifice, also uncorked, of the passage of the said plug. The latter is then turned into the position so that the contents of the capsule $r$ can fall into the bottle, the latter always remaining closed in an air-tight manner, and can mix with the liquid owing to the arrangement of the inclined passages $x\,y$. This mixing can be assisted by turning the bottle and shaking it without any gas being lost. Having done this, the plug $i$ is brought into its closed position, the capsule $r$ removed, the central passage of the plug corked, and the bottle is then ready to be delivered and used in the conditions specified.

Especially in the making of champagne-wines the capsule $r$ may be used also for removing the ferment or yeast, the said capsule taking up the sediment caused by fermentation and which is to be expelled by such operation.

What I claim as my invention, and desire to secure by Letters Patent, is—

1. In a stoppering device, the combination with a bottle-neck having a collar and a sectional casing adapted to engage the neck below the collar, of a cock having a hollow perforated plug with one end open and constituting the cock-outlet, and a guard inclosing the bottle-neck collar and securing the cock to the sectional casing with its outlet concentric with the bottle-neck.

2. In a stoppering device, the combination with a bottle-neck having a collar and a sectional casing adapted to engage the neck below the collar and having a screw-thread on its upper end, of a nut adapted to engage a portion of the screw-thread of the casing and clamp the sections thereof together and onto the bottle-neck, and a cock having a hollow perforated plug with one end open and constituting the cock-outlet, and a guard inclosing the bottle-neck collar and securing the cock to the sectional casing with its outlet concentric with the bottle-neck.

3. In a stoppering device the combination with a bottle-neck having a collar and a sectional casing adapted to engage the neck below the collar and with a screw-thread on its upper end, of a cock-casing placed within the bottle-neck, having a guard extending over the bottle-neck collar and screw-threaded internally to engage the sectional-casing thread; side openings in the cock-casing; a hollow plug fitting and rotatably secured within the cock-casing and having side openings and an open end; a head to the plug extending above the bottle-neck and adapted to rotate the same: substantially as specified.

4. In a stoppering device the combination with a bottle-neck having a collar, a sectional casing adapted to engage the neck below and the collar with a screw-thread on its upper end, and a nut adapted to engage a portion of the screw-thread of the casing, of a cock-casing placed within the bottle-neck; having a guard extending over the bottle-neck collar and screw-threaded internally to engage the sectional-casing thread; side openings in the cock-casing; a hollow plug fitting and rotatably secured within the cock-casing and having side openings and an open end; a head to the plug extending above the bottle-neck and adapted to rotate the same: substantially as specified.

5. In a stoppering device the combination with a bottle-neck having a collar and a sectional casing adapted to engage the neck below the collar and with a screw-thread on its upper end, of a cock-casing placed within the bottle-neck, having a guard extending over the bottle-neck collar and screw-threaded internally to engage the sectional-casing thread; side openings in the cock-casing; a hollow plug fitting and rotatably secured within the cock-casing and having side openings and an open end; the side openings ending in a slanting floor to prevent the lodgment of matter within the plug: a head to the plug extending above the bottle-neck and adapted to rotate the same: substantially as specified.

6. In a stoppering device the combination with a bottle-neck having a collar and a sectional casing adapted to engage the neck below the collar and with a screw-thread on its upper end, of a cock-casing placed within the bottle-neck, having a guard extending over the bottle-neck collar and screw-threaded internally to engage the sectional-casing thread: side openings in the cock-casing: a hollow plug fitting and rotatably secured within the cock-casing and having side openings and an open end: a head to the plug extending above the bottle-neck and adapted to rotate the same: a screw-thread within the upper portion of the hollow plug and a capsule having a neck shaped and screw-threaded to engage within the said plug and with the screw-thread thereof substantially as specified.

In testimony whereof I have signed my name to this specification in the presence of two subscribing witnesses.

JULES ROGER.

Witnesses:
LOUIS SULLIGER,
J. ALLISON BOWEN.